Feb. 6, 1951     A. E. WEBB     2,540,975
LUBRICATING DEVICE
Filed July 16, 1945
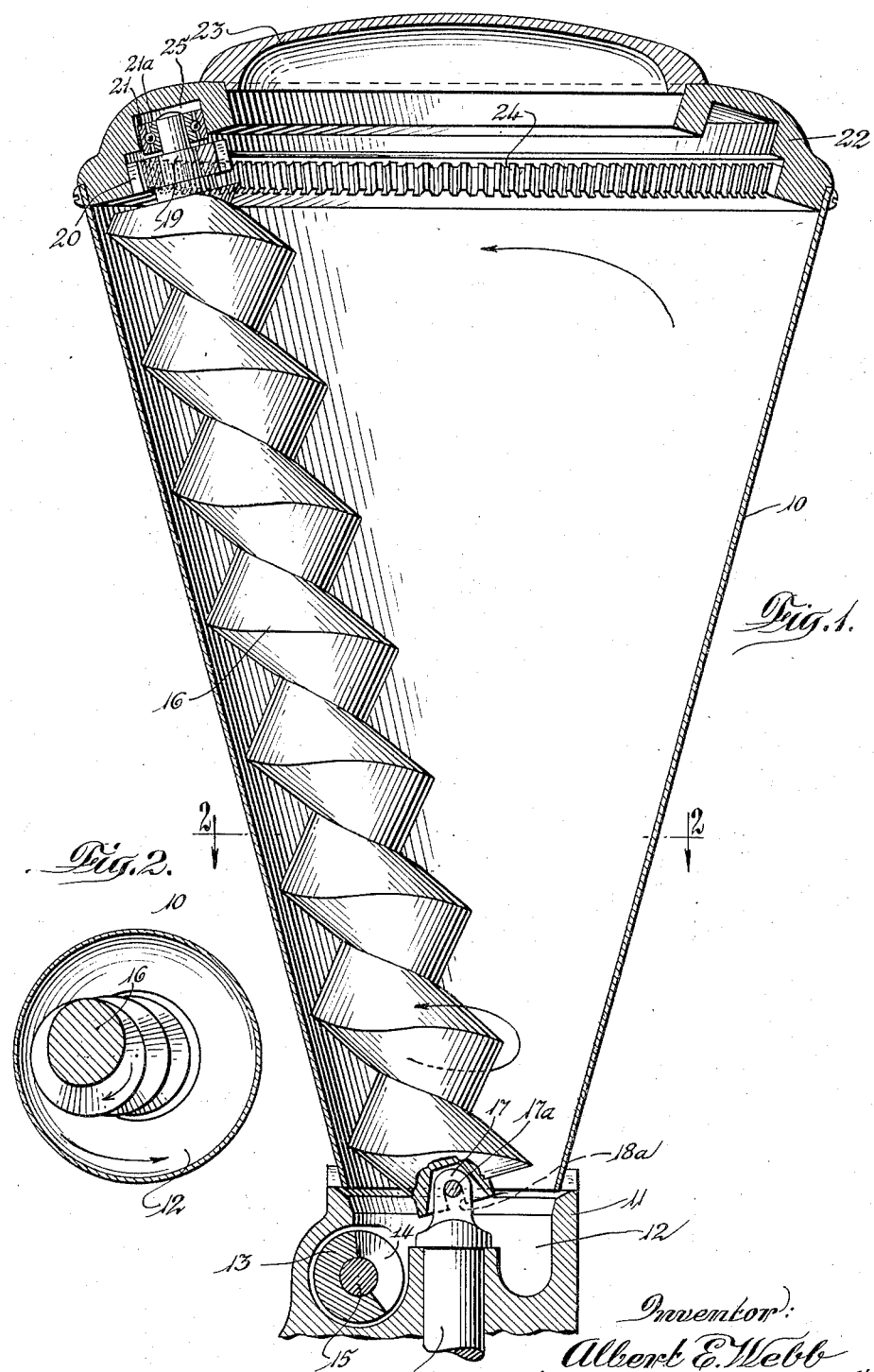

Patented Feb. 6, 1951

2,540,975

UNITED STATES PATENT OFFICE 2,540,975

LUBRICATING DEVICE

Albert E. Webb, Chicago, Ill., assignor to Stewart-Warner Corporation, Chicago, Ill., a corporation of Virginia Application July 16, 1945, Serial No. 605,359

13 Claims. (Cl. 184—36)

This invention relates to lubricating apparatus, and more particularly to a lubricant compressor capable of forcing extremely viscous lubricant to bearings to be lubricated.

The proper lubrication of many machines and devices requires the use of an extremely heavy viscous lubricant, and the lubricant ordinarily used is a grease with a consistency approaching that of putty or ordinary bar soap. In the past, some difficulty has arisen in attempts to provide a lubricant compressor capable of forcing such heavy grease into the bearings to be lubricated. The difficulty arises both from the consistency of the lubricant and from the fact that the lubricant usually is placed in the compressor in the form of large lumps, which are difficult to reduce to a sufficiently plastic and coherent mass which will flow into and prime the cylinder of the lubricant compressor.

It is an object of this invention to provide a lubricant compressor capable of receiving large lumps of viscous lubricant and breaking the lumps and feeding the lubricant, as a coherent mass, under pressure to high pressure pump cylinders.

Another object is to provide an improved lubricant compressor which substantially eliminates air pockets in the lubricant.

A further object is the provision of an improved lubricant compressor which compacts hard lubricant under substantially uniform pressure.

A still further object is the provision of a lubricant compressor which provides a substantially uniform, continuous feed of lubricant.

Still another object is the provision of a lubricant compressor which is extremely simple in construction and operation, and which may be economically manufactured and operated.

Further objects and advantages of the present invention will be apparent to those skilled in the art, from the following description and the accompanying drawings, in which:

Fig. 1 is a vertical sectional view of the lubricant compressor of this invention, with parts in elevation; and Fig. 2 is a reduced horizontal sectional view taken along the line 2—2 of Fig. 1.

The lubricant compressor comprises a hopper 10 of generally conical form suitably mounted on a base 11. Below the mouth of the hopper 10 the base 11 is provided with an annular depression or recess 12. A high pressure cylinder 13 is suitably secured in the base 11 and has a radial inlet port 14 communicating with the depression 12. A piston or plunger 15 is reciprocable in the cylinder 13 to force lubricant therethrough and into a suitable conduit (not shown) for delivery to one or more bearings. The construction of the cylinder and plunger may be similar to that shown in the Ernest W. Davis Patent No. 1,980,984, issued November 20, 1934. The plunger may be operated by any suitable means, such as those disclosed in the aforesaid patent. Although only one cylinder and one plunger are shown in the drawings, it will be obvious that a plurality of cylinders and plungers may be provided if desired.

Disposed within the hopper 10 is a helical conveyor 16 the helical ridge or land of which lies closely adjacent to, but preferably slightly spaced from, the inner surface of the hopper, and is arranged with its axis parallel to the hopper wall in a vertical diametral plane. The lower end of the helical conveyor 16 is connected by a suitable universal joint 17 to a drive shaft 18 which extends vertically through the base 11 centrally of the mouth of the hopper 10, and is driven by any suitable means (not shown). The universal joint 17 is shown as a pin 17a secured in the flattened end of shaft 18 and having its ends projecting into slots 18a formed in the lower end of conveyor 16. The specific joint illustrated and described might be replaced by any other desired connection through which the conveyor 16 may be driven by the shaft 18.

An axial spindle portion 19 extends from the upper end of the helical conveyor 16, and a pinion 20 is keyed or otherwise suitably fixed on this spindle. Also disposed on the spindle 19, above the pinion 20, is a roller 21 mounted on a suitable anti-friction bearing 21a.

The upper end of the hopper 10 is closed by a ring gear casting 22 and a central circular domed cover 23 which closes the opening of the casting 22. An internal gear 24 is formed on the inner surface of the casting 22, the teeth of this gear meshing with those of the pinion 20. The gear 24 is coned to correspond to the angle of the pinion 20 resulting from the angle at which the conveyor 16 is necessarily disposed. An annular groove 25 is formed in the casting 22 above the internal gear 24 and has a cross sectional size and shape such as to provide a guide for the roller 21. The annular casting 22 may be secured on the hopper in any suitable manner, and the cover 23 may be hinged on the annular casting 22.

Upon rotation of the drive shaft 18, the helical conveyor is rotated and the heavy lubricant in the hopper is forced downwardly by the conveyor. The lubricant is compacted and compressed against the wall of the hopper 10 by the conveyor 16, and worked into a homogeneous mass so that air pockets or bubbles are substantially eliminated. As the lubricant is forced downwardly, it enters the depression 12 and moves under the pressure produced by the conveyor 16 through the inlet port 14 into the cylinder 13, and then is forced axially through the cylinder by reciprocation of the plunger 15 and forced through a suitable conduit to the bearings which are to be lubricated.

The rotation of the helical conveyor 16 by the shaft 18, as will be evident, also causes the conveyor to revolve around the inside of the hopper by reason of the meshing of the pinion 20 with the internal gear 24. The conveyor 16 thus has a rolling motion relative to the inner surface of the hopper 10, and forces the lubricant downwardly along the inner surface of the hopper. The rotation and the revolution of the helical conveyor 16 breaks down the lumps of lubricant, as well as compresses the lubricant, forcing the air therefrom. The lubricant is thus reduced to a relatively plastic homogeneous mass so that it can pass without difficulty into the cylinder 13, as previously explained.

Since the conveyor 16 defines a cone in its revolution, the central mass of lubricant is gradually drawn radially outwardly and downwardly. This is due to the cohesion of the lubricant and also in part to the action of gravity, since the central lubricant mass is undercut by the conveyor. The lubricant in the center of the hopper is drawn toward the conveyor and hopper wall by its adhesion to the conveyor and forced downwardly thereby. Thus all of the lubricant in the hopper is moved downward and out of the hopper. Since the conveyor rolls about the entire inner surface of the hopper, the downward movement of the lubricant is substantially uniform throughout the hopper, and a continuous uniform feed of lubricant to the cylinder and bearings results. Because of the viscous nature of the lubricant, it is pressed downwardly into the depression 12 and cylinder 13 under substantial pressure, so that the cylinder 13 will prime itself completely and rapidly.

The disposition of the roller bearing 21 in the groove 25 of the casting 22, and the connection of the lower end of the conveyor 16 to the shaft 18, maintain the conveyor in the desired relation to the inner surface of the hopper 10 as it rotates and revolves in the hopper. It will be clear from the drawing and from the preceding description that the lower end of the helical conveyor has only a rotary motion, since the revolution of this end is about a point centrally of the hopper mouth. The size of the helical conveyor 16 is such that the high thread portion at the bottom thereof is maintained closely adjacent the hopper wall as the conveyor rotates. The upper end of the helical conveyor 16, of course, while rotating about the conveyor axis, describes a circle prescribed by the annular guide groove 25 for the roller bearing 21.

Depending upon the particular formation of the helical conveyor 16, the conveyor is rotated either clockwise or counterclockwise. As indicated by the arrows in Fig. 2 of the drawing, the helical conveyor rotates clockwise (in plan view) and revolves counterclockwise about the interior of the hopper 10. It will be clear that the casting 22 might be formed with an ordinary spur gear, instead of the internal gear shown.

While there is shown and described herein certain structure illustrating the invention, it is to be understood that the invention is not limited thereto or thereby, but may assume numerous other forms and includes all modifications, variations, and equivalents coming within the scope of the following claims.

I claim:

1. In a compressor for viscous non-liquid lubricant, a generally conical hopper for said lubricant, a helical conveyor member in said hopper closely adjacent the wall thereof and having its axis parallel to the hopper wall, means for simultaneously rotating said conveyor about its axis and revolving the same along said wall to force lubricant downwardly, a cylinder having an opening to receive said lubricant, and a plunger reciprocable in said cylinder to force said lubricant therethrough.

2. In a compressor for heavy non-liquid lubricant, a generally conical hopper receiving said lubricant, an internal gear at the upper end of said hopper, a helical conveyor in said hopper adjacent and parallel to the inner surface thereof, a pinion on said conveyor meshing with said gear, a shaft at the lower end of said hopper connected to said conveyor, and means to drive said shaft for rotation and revolution of said conveyor.

3. In a compressor for heavy non-liquid lubricant, a generally conical hopper receiving said lubricant, an internal gear at the upper end of said hopper, a helical conveyor in said hopper adjacent and parallel to the inner surface thereof, a pinion on said conveyor meshing with said gear, a shaft at the lower end of said hopper connected to said conveyor, means to drive said shaft for rotation and revolution of said conveyor, a cylinder connected to said hopper, and a plunger reciprocable in said cylinder.

4. A compressor for heavy non-liquid lubricant comprising a base, a depression in said base, a cylinder, a passageway connecting said depression and cylinder, a plunger reciprocable in said cylinder, a conical hopper on said base opening into said depression, an internal gear at the upper end of said hopper, helical means in said hopper extending parallel to and adjacent the inner surface thereof, a pinion on said helical means meshing with said internal gear, and driving means extending through said base connected to said helical means for rotation and revolution thereof to force lubricant from said hopper into said cylinder.

5. A compressor for heavy non-liquid lubricant comprising a generally conical hopper, a helical conveyor in said hopper adjacent and having its axis parallel to the inner surface thereof, and means to roll said conveyor relative to said surface for causing downward movement of lubricant disposed in said hopper, said means including a gear at the top of said hopper, a pinion on said conveyor meshing with said gear, and driving means at the lower end of said conveyor for rotating said conveyor and pinion.

6. A compressor for heavy non-liquid lubricant comprising a generally conical hopper, a helical conveyor within said hopper adjacent and with its axis parallel to the inner surface thereof, a gear about the upper portion of said hopper, a pinion at the top of said conveyor in mesh with said gear, driving means connected to the bottom of said conveyor to roll the same relative to said inner surface for forcing downwardly lubricant disposed in said hopper, and means for ejecting said lubricant comprising a cylinder having an aperture to receive lubricant and a plunger reciprocable in said cylinder to force lubricant therethrough.

7. In a compressor for viscous nonliquid lubricant, a generally conical hopper for said lubricant, a helical conveyor member in said hopper having a linear axis closely adjacent and parallel to the hopper wall, means for rotating said conveyor, and means to cause the conveyor to revolve along the inner surface of the hopper to force lubricant downwardly.

8. A compressor for viscous nonliquid lubricant comprising, a generally conical hopper having its axis vertical and its larger diameter at the top, a helical conveyor in said hopper, said conveyor having its land closely adjacent the inner surface of the hopper and having its axis parallel thereto, means to rotate the helical conveyor about its axis and means to cause it to roll, as an incident to its rotary movement, the rolling movement causing the land thereof to pass closely adjacent the inner surface of the hopper and to remove lubricant adhering to this surface thereby to advance the lubricant generally in the direction of the axis of the conveyor.

9. A compressor for viscous nonliquid lubricants comprising, a generally conical hopper, a helical blade conveyor in said hopper, the axis of said conveyor being parallel to and near the inner surface of the hopper, means to rotate the conveyor about its axis, and means to cause planetary revolution of the conveyor closely adjacent the inner surface of the hopper.

10. The combination set forth in claim 9, in which the means for causing planetary revolution of the conveyor comprises a ring gear fixed relative to the hopper, and a pinion meshing with the ring gear and secured to the conveyor.

11. A compressor for viscous nonliquid lubricants comprising, a reservoir having an interior surface of revolution of a straight line about the axis of the reservoir, a helical conveyor located closely adjacent the interior surface of the reservoir, means to rotate the conveyor, and means to cause planetary movement of the conveyor near the interior surface of the reservoir.

12. The combination set forth in claim 11, in which the interior surface of the reservoir is vertically conical with its greater diameter at the top, and in which the means for rotating the conveyor comprises a drive shaft and a universal joint connection between the lower end of the conveyor and the drive shaft.

13. A compressor for viscous nonliquid lubricant comprising, a reservoir having an interior surface of revolution of a straight line about the axis of the reservoir, a helical conveyor, and means to support said conveyor with its land closely adjacent the interior surface of the reservoir including means to rotate the conveyor and means to cause planetary movement of the conveyor near the interior surface of the reservoir.

ALBERT E. WEBB.

REFERENCES CITED

The following references are of record in the file of this patent:

UNITED STATES PATENTS

| Number | Name | Date |
|---|---|---|
| 1,634,563 | Shaw | July 5, 1927 |
| 1,845,429 | Lorenz et al. | Feb. 16, 1932 |
| 1,859,290 | Davis | May 24, 1932 |
| 1,980,984 | Davis | Nov. 20, 1934 |

FOREIGN PATENTS

| Number | Country | Date |
|---|---|---|
| 71,254 | Austria | Feb. 25, 1916 |
| 501,897 | Germany | July 8, 1930 |
| 563,578 | Germany | Nov. 7, 1932 |